United States Patent
Takagaki et al.

(10) Patent No.: US 10,033,274 B2
(45) Date of Patent: Jul. 24, 2018

(54) CHOPPER CIRCUIT CONTROL DEVICE FOR CONTROLLING A DUTY CYCLE OF A CHOPPER CIRCUIT IN ACCORDANCE WITH LIMITS OF AN OPERATION VALUE RANGE

(71) Applicant: Mitsubishi Electric Corporation, Chiyoda-ku, Tokyo (JP)

(72) Inventors: Kota Takagaki, Tokyo (JP); Ryotaro Harada, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/516,350

(22) PCT Filed: Oct. 2, 2014

(86) PCT No.: PCT/JP2014/076381
§ 371 (c)(1),
(2) Date: Mar. 31, 2017

(87) PCT Pub. No.: WO2016/051567
PCT Pub. Date: Apr. 7, 2016

(65) Prior Publication Data
US 2017/0302155 A1 Oct. 19, 2017

(51) Int. Cl.
*H02M 3/157* (2006.01)
*H02M 3/156* (2006.01)
*H02M 1/32* (2007.01)

(52) U.S. Cl.
CPC .............. *H02M 3/156* (2013.01); *H02M 1/32* (2013.01)

(58) Field of Classification Search
CPC ........................................ H02M 3/156–3/1588
See application file for complete search history.

(56) References Cited

U.S. PATENT DOCUMENTS 6,898,091 B2 * 5/2005 Van Bodegraven ........................ H02M 3/33507
363/21.02
2003/0174005 A1 * 9/2003 Latham, II ............ H02M 3/157
327/172

(Continued)

FOREIGN PATENT DOCUMENTS

JP 4-255460 A 9/1992
JP 9-140150 A 5/1997

(Continued)

OTHER PUBLICATIONS

International Search Report (PCT/ISA/210) dated Dec. 16, 2014, by the Japanese Patent Office as the International Searching Authority for International Application No. PCT/JP2014/076381.

(Continued)

*Primary Examiner* — Gary L Laxton
*Assistant Examiner* — Peter Novak
(74) *Attorney, Agent, or Firm* — Buchanan Ingersoll & Rooney PC

(57) ABSTRACT

A range calculator (12) calculates an operation value range, which is range of an operation value tor controlling a duty cycle of a chopper circuit (4) based on an input voltage and output voltage command value of the chopper circuit (4). A chopper circuit control device (1) controls the duty cycle of the chopper circuit (4) by using an upper limit value of the operation value range when an operation value is greater than or equal to the upper limit value of the operation value range, by using the operation value when the operation value is within the operation value range, and by using a lower limit value of the operation value range when the operation value is less than or equal to the lower limit value of the operation value range.

4 Claims, 4 Drawing Sheets

(56) References Cited

U.S. PATENT DOCUMENTS

| | | | |
|---|---|---|---|
| 2006/0119333 A1 | 6/2006 | Nakamura | |
| 2009/0204308 A1* | 8/2009 | Manan | F02D 31/001 701/102 |
| 2011/0172845 A1* | 7/2011 | Kulyk | G06Q 10/04 700/296 |
| 2013/0249511 A1* | 9/2013 | Kalje | G05F 1/10 323/271 |

FOREIGN PATENT DOCUMENTS

| | | |
|---|---|---|
| JP | 2004-364416 A | 12/2004 |
| JP | 2005-80336 A | 3/2005 |
| JP | 2014-7827 A | 1/2014 |

OTHER PUBLICATIONS

Written Opinion (PCT/ISA/237) dated Dec. 16, 2014, by the Japanese Patent Office as the International Searching Authority for International Application No. PCT/JP2014/076381.
Japanese Office Action for JP 2016-549405 dated Nov. 8, 2016 and partial translation (6 pages).

* cited by examiner

CHOPPER CIRCUIT CONTROL DEVICE FOR CONTROLLING A DUTY CYCLE OF A CHOPPER CIRCUIT IN ACCORDANCE WITH LIMITS OF AN OPERATION VALUE RANGE

TECHNICAL FIELD

The present disclosure relates to a chopper circuit control device.

BACKGROUND ART

An auxiliary power-supply device mounted in electric rolling stock (hereinafter simply referred to as an electric train), is a device that converts a DC voltage into a desired DC voltage or an desired AC voltage and includes a step-down chopper for controlling a DC voltage. Generally, an output voltage sensor measures the output voltage of the step-down chopper and detects whether the output voltage of the step-down chopper is overvoltage or undervoltage using the measurement value of the output voltage sensor. When a fault occurs in the output voltage sensor, the duty cycle of the step-down chopper can increase to the extent that the output voltage of the step-down chopper is in overvoltage. When the output voltage of the step-down chopper is overvoltage or undervoltage, this can adversely affect operation of a load device connected to the auxiliary power-supply device.

The voltage converter disclosed in Patent Literature 1 determines that a fault occurs in the voltage converter when an operation value utilized by controlling means for manipulating the duty cycle is greater than or equal to a predetermined upper limit value or less than or equal to a predetermined lower limit value. Patent Literature 1 also discloses an electric train equipped with the voltage converter that stops control of a semiconductor element when a fault is detected in the voltage converter.

CITATION LIST

Patent Literature

Patent Literature 1: Unexamined Japanese Patent Application Kokai

SUMMARY OF INVENTION

Technical Problem

The electric train disclosed in Patent Literature 1 prohibits regenerative operation by switching a semiconductor element off when it is determined that a fault occurs in the voltage converter. As in Patent Literature 1, if the control of the semiconductor element halts after a fault occurs in the voltage converter, the supply of power to a load device connected to the voltage convener also halts. However, it is preferable that the auxiliary power-supply device mounted in an electric train continues the supply of power as much as possible in order to provide power to air-conditioning equipment, lighting equipment and the like. That is, for the auxiliary power-supply device, in addition preventing overvoltage or undervoltage of output voltage of the auxiliary power-supply device, it is also important to avoid halting the supply of power to a load device connected to the auxiliary power-supply device.

The present disclosure is developed in view of the above-mentioned circumstances and an objective of the present disclosure is to keep the output voltage of a chopper circuit within the defined range while maintaining the driving of the chopper circuit.

Solution to Problem

In order to achieve the aforementioned objective, a chopper circuit control device of the present disclosure includes a range calculator and a controller, and controls a duty cycle of a chopper circuit. The range calculator calculates, based on an input voltage of the chopper circuit and an output voltage command value that is a command value of an output voltage of the chopper circuit, an operation value range that is a range of operation values useable for controlling the duty cycle. The range calculator calculates the operation value range by using an upper limit value of a voltage range, being a defined range, when the input voltage is greater than or equal to the upper limit value of the voltage range, by using the input voltage when the input voltage is within the voltage range, and by using a lower limit value of the voltage range when the input voltage is less than or equal to the lower limit value of the voltage range. The controller determines whether the operation value calculated based on a deviation between the output voltage and the output voltage command value of the chopper circuit is within the operation value range. The controller controls the duty cycle by using an upper limit value of the operation value range when the operation value calculated based on a deviation between the output voltage and the output voltage command value of the chopper circuit is greater than or equal to the upper limit value of the operation value range, by using the operation value when the operation value is within the operation value range, and by using a lower limit value of the operation value range when the operation value is less than or equal to the operation value range.

Advantageous Effects of Invention

According to the present disclosure, when an operation value that is used for control of a duty cycle of a chopper circuit exceeds a defined range, an output voltage of the chopper circuit can be kept within the defined range while maintaining the driving of the chopper circuit by controlling the duty cycle of the chopper circuit with use of an upper limit value or a lower limit value of the defined range to control the duty cycle.

DESCRIPTION OF EMBODIMENTS

Hereinafter, embodiments of the present disclosure are described in detail with reference to the drawings. In the Embodiment 1

Figure 1:
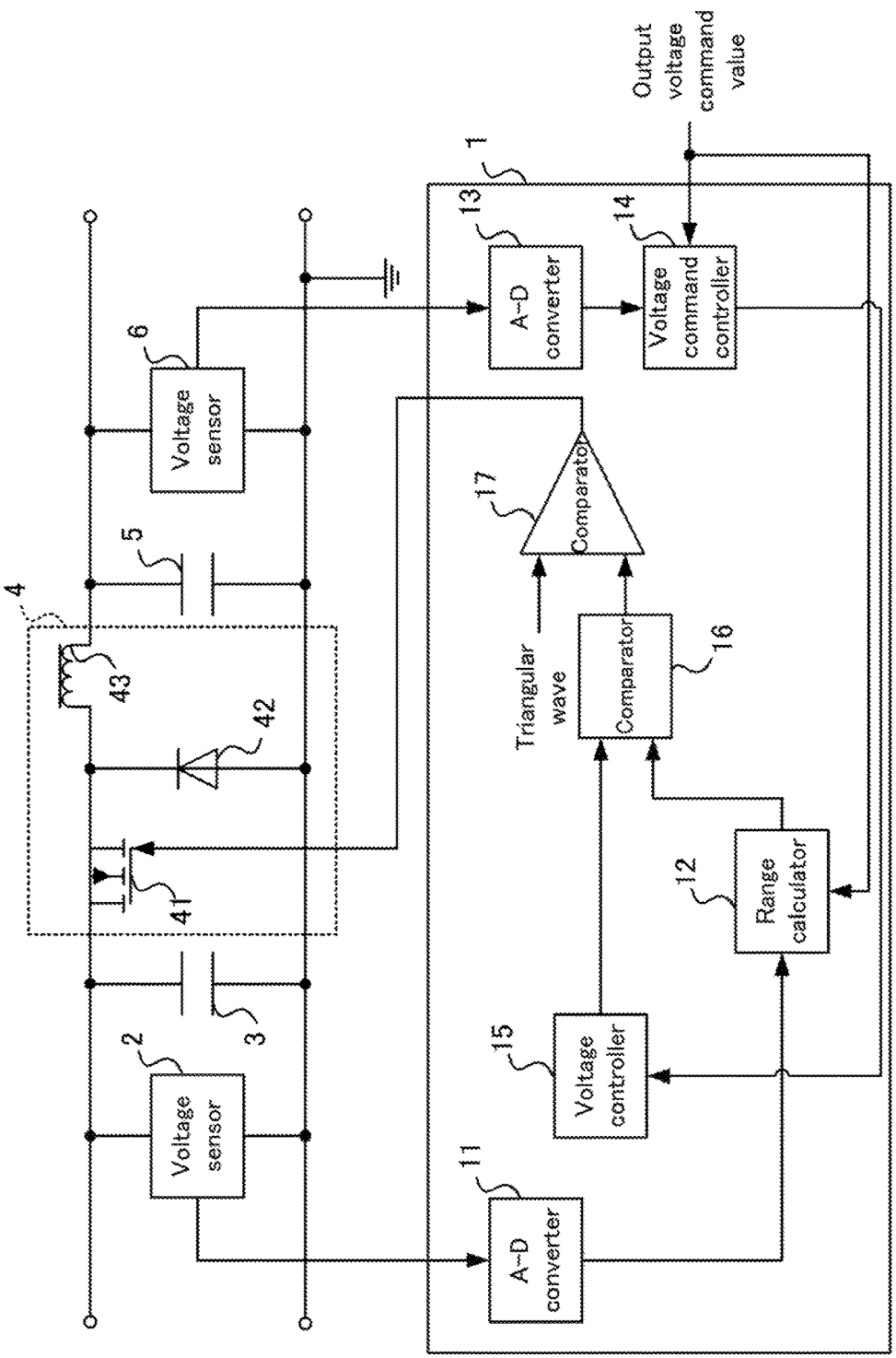
FIG. 1 is a block diagram illustrating an example configuration of a chopper circuit control device according to Embodiment 1 of the present disclosure.

FIG. 1 is a block diagram illustrating an example configuration of a chopper circuit control device according to Embodiment 1 of the present disclosure. A chopper circuit control device t controls a switching element 41 of a chopper circuit 4 so that an output voltage of the chopper circuit 4 comes close to an output voltage command value which is a command value for the output voltage. The chopper circuit control device 1 controls a duty cycle of the chopper circuit 4 by outputting to the switching element 41 a gate signal based on an operation value. The operation value is a value for adjusting an on-duty time of the switching element 41. When the operation value exceeds a defined range, the chopper circuit control device 1 uses an upper limit value or a lower limit value of the defined range to control the duty cycle.

The chopper circuit 4 of FIG. 1 is a step-down chopper circuit that includes the switching element 41, a diode 42, and an inductor 43. The configuration of the chopper circuit 4 is not limited to the example in FIG. 1. The chopper circuit 4 is an optional circuit that includes the switching element 41 for converting a DC voltage or an AC voltage at will to a desired DC voltage or a desired AC voltage. For example, a step-up chopper circuit may be used as the chopper circuit 4.

In the example of FIG. 1, the switching element 41 is an n-type metal-oxide-semiconductor field-effect transistor (MOSFET) but the switching element 41 is not limited to the MOSFET and may be any kind of semiconductor element that performs switching. The switching element 41 is connected to a high potential terminal of the pair of input terminals of the chopper circuit 4, the cathode of the diode 42, and an end of the inductor 43. The anode of the diode 42 is connected to a low potential terminal of the pair of input terminals of the chopper circuit 4 and a low potential terminal of the pair of output terminals of the chopper circuit 4. The other end of the inductor 43 is connected to a high potential terminal of the pair of output terminals of the chopper circuit 4.

A voltage sensor 2 detects as an input voltage of the chopper circuit 4 a voltage across a capacitor 3 connected to the input terminals of the chopper circuit 4. A voltage sensor 6 detects as an output voltage of the chopper circuit 4 a voltage across a capacitor 5 connected to the output terminals of the chopper circuit 4.

The chopper circuit control device 1 includes an analog-to-digital (A-D) converter 11 that performs an A-D (analog-to-digital) conversion of the input voltage of the chopper circuit 4 detected by the voltage sensor 2 and an A-D converter 13 that performs an A-D conversion of the output voltage of the chopper circuit 4 detected by the voltage sensor 6. Further, the output voltage command value is input into the chopper circuit control device 1. The input voltage A-D converted with the A-D converter 11 is input in a range calculator 12 of the chopper circuit control device 1. The range calculator 12 calculates, based on the input voltage and the output voltage command value, an operation value range that is a range for the operation value of the chopper circuit 4. The output voltage A-D converted with the A-D converter 13 is input in a voltage command controller 14 of the chopper circuit control device 1. The voltage command controller 14 calculates a deviation between the output voltage and the output voltage command value. The deviation between the output voltage and the output voltage command value is input in a voltage controller 15 of the chopper circuit control device 1. The voltage controller 15 calculates an operation value of the chopper circuit 4 based on the deviation between the output voltage and the output voltage command value. A comparator 16 of the chopper circuit control device 1 compares the operation value range calculated by the range calculator 12 with the operation value calculated by the voltage controller 15 and outputs to a comparator 17 of the chopper circuit control device 1, an upper limit value or a lower limit value of the operation value range when the operation value exceeds the operation value range, and outputs to a comparator 17 of the chopper circuit control device 1, the operation value when the operation value is within the operation value range. The comparator 17 performs a comparison operation between the output of the comparator 16 and a reference triangular wave, and then generates a gate signal. The gate signal output by the comparator 17 controls the switching on and off of the switching element 41 and controls the duty cycle of the chopper circuit 4.

The range calculator 12 calculates the operation value range based on the A-D converted input voltage and the output voltage command value. The output voltage command value is a command value of the output voltage of the chopper circuit 4, and is a value that is determined in accordance with the load device connected to the output terminals of the chopper circuit 4. The chopper circuit control device 1 may receive an output voltage command value from outside and the chopper circuit control device 1 may store in advance an output voltage command value. In Embodiment 1, the range calculator 12 sets, as an upper limit value of the operation value range, a value obtained by multiplying (i) a first proportional constant by (ii) a value obtained by dividing the output voltage command value by the A-D convened input voltage, and sets, as a lower limit value of the operation value range, a value obtained by multiplying (i) a second proportional constant being a value that is smaller than the first proportional constant by (ii) the value obtained by dividing the output voltage command value by the A-D converted input voltage. The first proportional constant and the second proportional constant are values determined in accordance with the characteristics of the chopper circuit 4. For example, the values may be determined based on the results of a simulation.

The voltage command controller 14 calculates a voltage deviation that is a deviation between the output voltage command value and the A-D convened output voltage, and then sends the voltage deviation to the voltage controller 15. The voltage controller 15 performs, for example, a proportional-integral (PI) control operation on the voltage deviation to calculate the operation value, and then sends the operation value to the comparator 16.

When the input operation value is greater than or equal to the upper limit value of the operation value range, the comparator 16 outputs the upper limit value of the operation value range as the operation value. When the input operation value is within the operation value range, that is, when the input operation value is less than the upper limit value of the operation value range and is greater than the lower limit value of the operation value range, the comparator 16 outputs the input operation value. When the input operation value is less than or equal to the lower limit value of the operation value range, the comparator 16 outputs the lower limit value of the operation value range as the operation value.

The comparator 17 calculates the duty cycle of the chopper circuit 4 by performing a comparison operation between the reference triangular wave and the operation value output by the comparator 16, and then outputs a gate signal for the switching element 41.

The chopper circuit control device 1 according to Embodiment 1 controls the chopper circuit 4 by using the operation value calculated based on the output voltage and the output voltage command value of the chopper circuit 4 under normal conditions in which the operation value is within the operation value range. However, when the operation value is not within the operation value range, the chopper circuit control device 1 calculates the duty cycle of the chopper circuit 4 based on the upper limit value or the lower limit value of the operation value range to control the chopper circuit 4. Therefore, for example, when a fault occurs in the voltage sensor 6, or when a fault occurs in the switching element 41, an overvoltage or an undervoltage of the output voltage of the chopper circuit 4 can be prevented while maintaining the driving of the chopper circuit 4.

Figure 2:
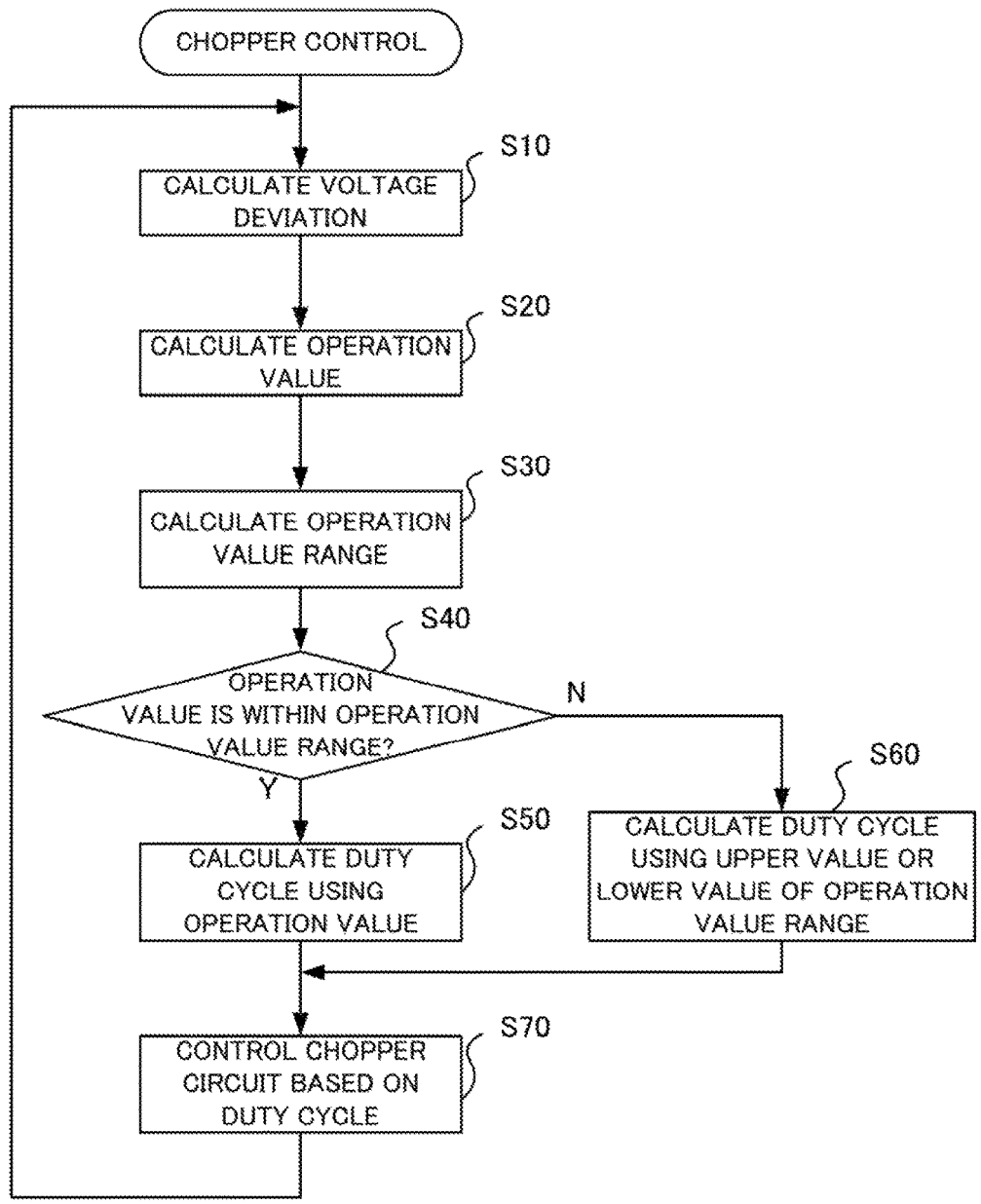
FIG. 2 is flowchart illustrating an example of a chopper control operation that is performed by the chopper circuit control device according to Embodiment 1.

FIG. 2 is a flowchart illustrating an example of a chopper control operation performed by the chopper circuit control device according to Embodiment 1. The voltage command controller 14 calculates the voltage deviation that is the deviation between the output voltage command value and the A-D converted output voltage (step S10). The voltage controller 15 performs, for example, a PI control operation on the voltage deviation to calculate the operation value (step S20). The range calculator 12 calculates the operation value range based on the value obtained by dividing the output voltage command value by the A-D converted input voltage (step S30).

When the input operation value is within the operation value range (step S40; Y), the comparator 16 outputs the input operation value and the comparator 17 uses the operation value to calculate the duty cycle of the chopper circuit 4 (step S50). When the input operation value is not within the operation value range (step S40; N), the comparator 16 outputs, as the operation value, the upper limit value or the lower limit value of the operation value range, and the comparator 17 uses the upper limit value or the lower limit value of the operation value range to calculate the duty cycle of the chopper circuit 4 (step S60).

The comparator 17 outputs, based on the duty cycle, the gate signal for the switching element 41 to control the chopper circuit 4 (step S70). The chopper circuit control device 1 repeatedly performs the above-described processing at a predetermined timing to control the duty cycle of the chopper circuit 4. The processing in step S30 may be performed in parallel with the processing in steps S10 and S20. Also, the processing in step S30 may be performed prior to the processing in steps S10 and S20.

As described above, the chopper circuit control device 1 according to Embodiment 1 can maintain the output voltage of the chopper circuit 4 within the defined range while maintaining the driving of the chopper circuit 4. Since the output voltage of the chopper circuit 4 is maintained within the defined range, overvoltage or undervoltage of the output voltage of the chopper circuit 4 can be prevented. Thus the load device connected to the output terminal of the chopper circuit 4 is prevented from being adversely affected by fluctuations in the output voltage of the chopper circuit 4.

Embodiment 2

Figure 3:
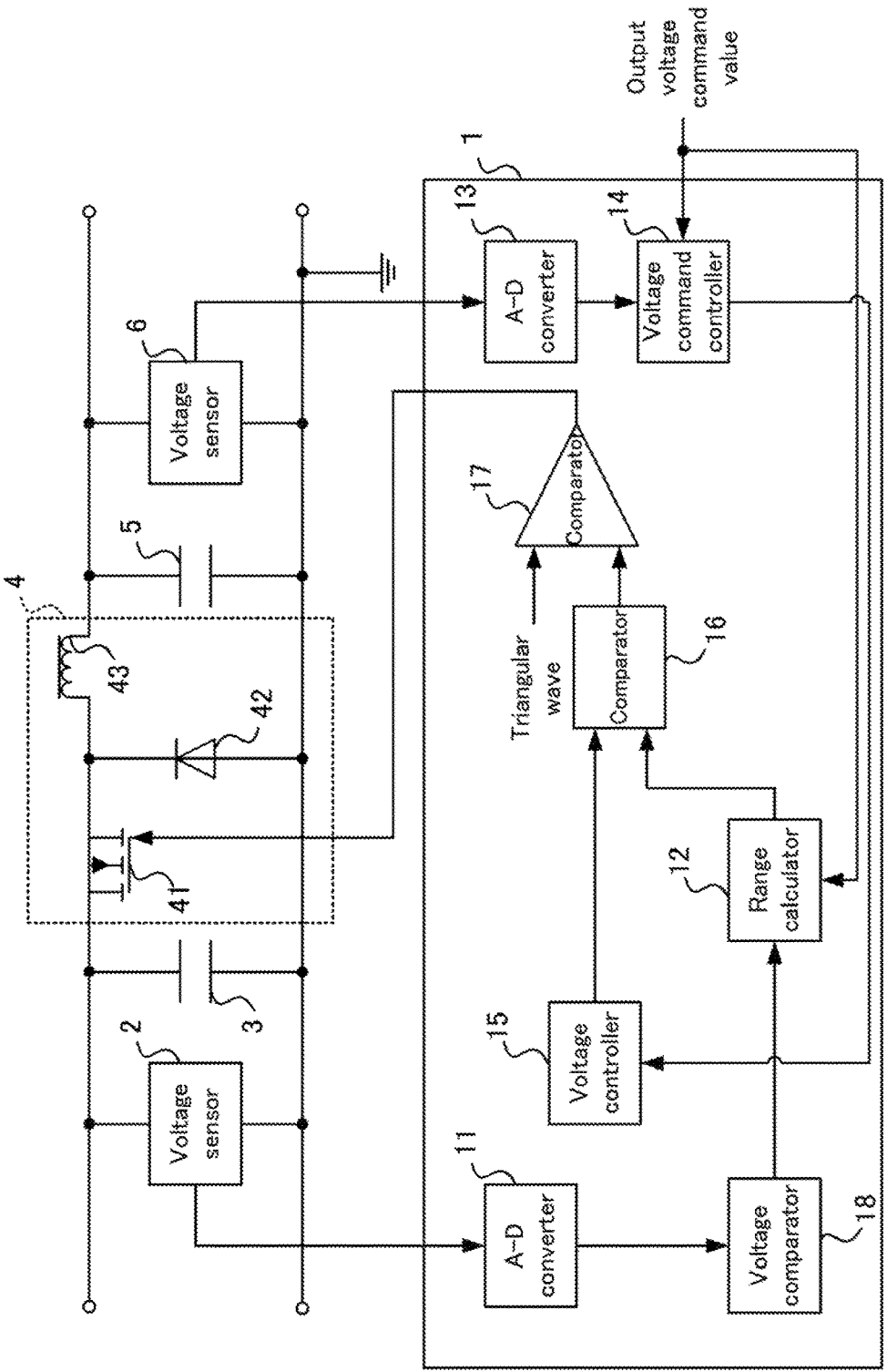
FIG. 3 is a block diagram illustrating an example configuration of a chopper circuit control device according to Embodiment 2 of the present disclosure.

FIG. 3 is a block diagram illustrating an example configuration of a chopper circuit control device according to Embodiment 2 of the present disclosure. When the input voltage of the chopper circuit 4 is not within a voltage range, which is a defined range, a chopper circuit control device 1 according to Embodiment 2 uses an upper limit value or a lower limit value of the voltage range to calculate the operation value range to control the chopper circuit 4 based on the operation value range. The chopper circuit control device 1 according to Embodiment 2 includes a voltage comparator 18 in addition to the configuration of the chopper circuit control device 1 according to Embodiment 1. The operations of the parts of the chopper circuit control device 1 according to Embodiment 2 that are different from that in Embodiment 1 are described next.

The voltage comparator 18 outputs the upper limit value of the voltage range as the input voltage when the A-D converted input voltage is greater than or equal to the upper limit value of the voltage range. When the A-D converted input voltage is within the voltage range, that is, when the A-D converted input voltage is less than the upper limit value of the voltage range and is greater than the lower limit value of the voltage range, the voltage comparator 18 outputs the A-D converted input voltage. When the A-D converted input voltage is less than or equal to the lower limit value of the voltage range, the voltage comparator 18 outputs the lower limit value of the voltage range as the input voltage.

The range calculator 12 calculates the operation value range based on input voltage that is output by the voltage comparator 18 and the output voltage command value. In Embodiment 2, the range calculator 12 sets, as an upper limit value of the operation value range, a value obtained by multiplying (i) a first proportional constant by (ii) a value obtained by dividing the output voltage command value by the input voltage that is output by the voltage comparator 18, and sets, as a lower limit value of the operation value range, a value obtained by multiplying (i) a second proportional constant by (ii) the value obtained by dividing the output voltage command value by the input voltage that is output by the voltage comparator 18. The upper limit value and the lower limit value of the voltage range are values determined in accordance with the characteristics of the chopper circuit 4. For example, the values may be determined based on the results of a simulation.

In the chopper circuit control device 1 according to Embodiment 2, when the A-D converted input voltage is not within the voltage range, the operation value range is calculated based on the upper limit value or the lower limit value of the voltage range. Therefore, large fluctuations with the operation value range can be prevented even when, for example, a fault occurs in voltage sensor 2.

Figure 4:
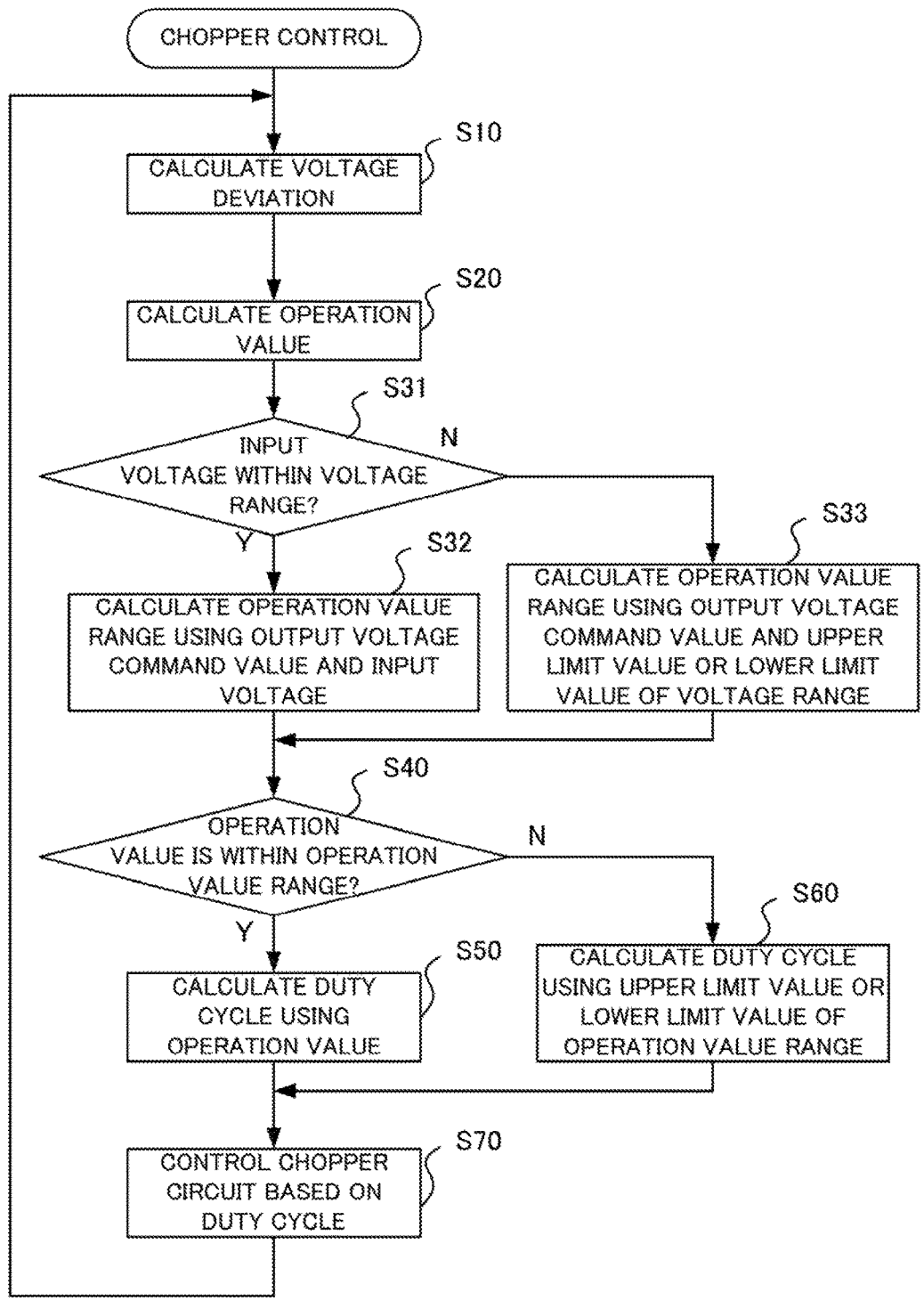
FIG. 4 is a flowchart illustrating an example of a chopper control operation that is performed by the chopper circuit control device according to Embodiment 2.

FIG. 4 is a flowchart illustrating an example of a chopper control operation that is performed by the chopper circuit control device 1 according to Embodiment 2. The processing in steps S10 and S20 are the same as the processing performed by the chopper circuit control device 1 according to Embodiment 1 illustrated in FIG. 2. When the A-D converted input voltage is within the voltage range (step S31; Y), the voltage comparator 18 outputs the A-D converted input voltage, and the range calculator 12 uses the output voltage command value and the input voltage to calculate the operation value range (step S32).

When the A-D converted input voltage is not within the voltage range (step S31; N), the voltage comparator 18 outputs the upper limit value or the lower limit value of the voltage range as the input voltage, and the range calculator 12 uses the output voltage command value and either the upper limit value or the lower limit value of the voltage range to calculate the operation value range (step S33). The processing of steps S40, S50, S60, and S70 are the same as the processing performed by the chopper circuit control device 1 according to Embodiment 1 illustrated in FIG. 2. The processing in steps S31, S32, and S33 may be performed in parallel with the processing in steps S10 and S20. Also, the processing in steps S31, S32, and S33 may be performed prior to the processing in steps S10 and S20.

As described above, the chopper circuit control device 1 according to Embodiment 2 can maintain the output voltage of the chopper circuit 4 within the defined range while maintaining the driving of the chopper circuit 4. Also, since the output value of the chopper circuit 4 can be maintained within the defined range even when a fault occurs in the voltage sensor 2 that detects the input voltage of the chopper circuit 4, the control accuracy of the output voltage of the chopper circuit 4 improves.

The embodiments of the present disclosure are not limited to the above-mentioned embodiments. The operation value range may be a range in which only the upper limit value is specified or may be a range in which only the lower limit value is specified. For example, in a case where the operation value range is a range in which only the upper limit value is specified, the chopper circuit control device 1 controls the duty cycle of the chopper circuit 4 by (i) using the upper limit value of the operation value range when the operation value is greater than or equal to the upper limit value of the operation value range, and (ii) using the operation value when the operation value is less than the upper limit value of the operation value range. Likewise, the voltage range may be a range in which only the upper limit value is specified or may be a range in which only the lower limit value is specified.

An auxiliary power-supply device mounted in the electric train that includes the above-described chopper circuit control device 1 may, when the operation value is not within the operation value range, (i) output a notification indicating that the operation value is not within the operation value range and (ii) display the notification on a monitor in the driver's room. By displaying the notification, the driver can be urged to, for example, handle the voltage sensor 6-based fault.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Chopper circuit control device
2 Voltage sensor
3 Capacitor
4 Chopper circuit
5 Capacitor
6 Voltage sensor
11 A-D converter
12 Range calculator
13 A-D converter
14 Voltage command controller
15 Voltage controller
16 Comparator
17 Comparator
18 Voltage comparator
41 Switching element
42 Diode
43 Inductor

The invention claimed is:

1. A chopper circuit control device for controlling a duty cycle of a chopper circuit, the chopper circuit control device comprising:
a range calculator to calculate, based on an input voltage of the chopper circuit and an output voltage command value being a command value of an output voltage of the chopper circuit, an operation value range being a range for an operation value that is used for controlling the duty cycle; and
a controller to determine whether the operation value calculated based on a deviation between the output voltage and the output voltage command value of the chopper circuit is within the operation value range and to control the duty cycle by using an upper limit value of the operation value range when the operation value is greater than or equal to the upper limit value of the operation value range, by using the operation value when the operation value is within the operation value range, and by using a lower limit value of the operation value range when the operation value is less than or equal to the lower limit value of the operation value range;
wherein the range calculator calculates the operation value range by using an upper limit value of a voltage range, being a defined range, when the input voltage is greater than or equal to the upper limit value of the voltage range, by using the input voltage when the input voltage is within the voltage range, and by using a lower limit value of the voltage range when the input voltage is less than or equal to the lower limit value of the voltage range.

2. The chopper circuit control device according to claim 1, wherein the range calculator sets, as the upper limit value of the operation value range, a value obtained by multiplying (i) a first proportional constant by (ii) a value obtained by dividing the output voltage command value by the input voltage, and sets, as the lower limit value of the operation value range, a value obtained by multiplying (i) a second proportional constant being a value that is smaller than the first proportional constant by (ii) the value obtained by dividing the output voltage command value by the input voltage.

3. The chopper circuit control device according to claim 1, wherein when the operation value is not within the operation value range, a notification is output indicating that the operation value is not within the operation value range.

4. The chopper circuit control device according to claim 3, wherein the range calculator sets, as the upper limit value of the operation value range, a value obtained by multiplying (i) a first proportional constant by (ii) a value obtained by dividing the output voltage command value by the input voltage, and sets, as the lower limit value of the operation value range, a value obtained by multiplying (i) a second proportional constant being a value that is smaller than the first proportional constant by (ii) the value obtained by dividing the output voltage command value by the input voltage.

* * * * *